US008181920B2

(12) United States Patent
Brown

(10) Patent No.: US 8,181,920 B2
(45) Date of Patent: May 22, 2012

(54) APPARATUS AND METHODS FOR AN EQUIPMENT STAND FOR A DRIVE-THRU EMPLOYEE STATION

(75) Inventor: Michael E. Brown, Kings Mills, OH (US)

(73) Assignee: E.F. Bavis & Associates, Inc., Maineville, OH (US)

( * ) Notice: Subject to any disclaimer, the term of this patent is extended or adjusted under 35 U.S.C. 154(b) by 546 days.

(21) Appl. No.: 11/834,966

(22) Filed: Aug. 7, 2007

(65) Prior Publication Data

US 2008/0033893 A1 Feb. 7, 2008

Related U.S. Application Data

(60) Provisional application No. 60/836,152, filed on Aug. 7, 2006.

(51) Int. Cl.
*F16M 13/00* (2006.01)

(52) U.S. Cl. ............... 248/125.8; 248/177.1; 108/50.01; 108/50.02

(58) Field of Classification Search ............... 248/177.1, 248/146, 599, 622, 631, 125.8; 108/147, 108/144.11, 50.01, 50.02, 150
See application file for complete search history.

(56) References Cited

U.S. PATENT DOCUMENTS

| | | | | |
|---|---|---|---|---|
| 4,401,036 | A * | 8/1983 | Russo et al. | 108/146 |
| D276,100 | S | 10/1984 | Middleton | |
| 4,756,496 | A * | 7/1988 | Hosan et al. | 248/161 |
| D309,307 | S | 7/1990 | Sigurdson | |
| 5,174,223 | A * | 12/1992 | Nagy et al. | 108/50.01 |
| 5,174,224 | A * | 12/1992 | Nagy et al. | 108/185 |
| D358,144 | S | 5/1995 | Masaaki | |
| D385,437 | S | 10/1997 | Carbone, Sr. | |
| 5,806,943 | A * | 9/1998 | Dell et al. | 312/223.3 |
| 5,868,079 | A * | 2/1999 | Charny | 108/7 |
| 6,019,325 | A | 2/2000 | Dotson et al. | |
| 6,076,785 | A * | 6/2000 | Oddsen, Jr. | 248/118.3 |
| 6,158,357 | A * | 12/2000 | Shih | 108/50.01 |
| 6,182,583 | B1 * | 2/2001 | Larson | 108/147 |
| D442,967 | S | 5/2001 | Goto | |
| 6,298,794 | B1 * | 10/2001 | Brown et al. | 108/50.01 |
| D454,136 | S | 3/2002 | Deuschle | |
| 6,374,752 | B1 * | 4/2002 | Walser | 108/50.01 |
| 6,397,761 | B1 * | 6/2002 | Moore | 108/50.01 |
| 6,435,109 | B1 * | 8/2002 | Dell et al. | 108/144.11 |
| D478,434 | S | 8/2003 | Pearlson | |
| 6,644,748 | B2 * | 11/2003 | Tholkes et al. | 297/423.12 |
| 6,832,560 | B2 * | 12/2004 | Seiler et al. | 108/7 |
| 6,877,442 | B2 * | 4/2005 | Helle | 108/147 |
| 6,964,542 | B1 * | 11/2005 | Sullivan | 405/272 |
| 7,009,840 | B2 * | 3/2006 | Clark et al. | 361/679.41 |
| D530,333 | S | 10/2006 | Richter | |

(Continued)

*Primary Examiner* — Nkeisha Smith
(74) *Attorney, Agent, or Firm* — Dinsmore & Shohl LLP

(57) ABSTRACT

Apparatus and methods for a drive thru terminal equipment stand comprising a base, a vertical support having a first end and a second end, wherein the first end is connected to the base, a framework connected to the second end of the vertical support, and a plurality of equipment supporting surfaces connected to the framework. The vertical support is operable to adjust the height of the framework along a vertical axis of the vertical support relative to the base. The framework and the plurality of equipment supporting surfaces are operable to rotate about the longitudinal axis of the vertical support. The plurality of equipment supporting surfaces are operable to support a plurality of employee equipment selected from the group consisting of a monitor, a keyboard, a computer mouse, a printer, a scanner, and a telephone.

19 Claims, 12 Drawing Sheets

U.S. PATENT DOCUMENTS

| | | | | |
|---|---|---|---|---|
| 7,306,192 | B2 * | 12/2007 | Sopp | 248/404 |
| 7,311,048 | B2 * | 12/2007 | Kopala, Jr. | 108/147 |
| 7,490,902 | B2 * | 2/2009 | Aubert | 297/300.5 |
| 7,506,592 | B2 * | 3/2009 | Rossini | 108/50.01 |
| 7,594,668 | B2 * | 9/2009 | Arceta et al. | 280/47.35 |
| 7,612,999 | B2 * | 11/2009 | Clark et al. | 248/918 |
| 2001/0047742 | A1 * | 12/2001 | Moore | 108/50.01 |
| 2004/0118984 | A1 | 6/2004 | Kim et al. | |
| 2004/0178304 | A1 * | 9/2004 | Lando | 248/118 |
| 2004/0211343 | A1 * | 10/2004 | Song | 108/50.01 |
| 2004/0256524 | A1 | 12/2004 | Beck et al. | |
| 2006/0096505 | A1 * | 5/2006 | Sykes | 108/50.01 |
| 2007/0266913 | A1 * | 11/2007 | Hardt | 108/147 |
| 2007/0290539 | A1 * | 12/2007 | Hosoe et al. | 297/344.11 |

* cited by examiner

APPARATUS AND METHODS FOR AN EQUIPMENT STAND FOR A DRIVE-THRU EMPLOYEE STATION

CROSS REFERENCE TO RELATED APPLICATIONS

This application claims priority to provisional application Ser. No. 60/836,152, filed Aug. 7, 2006 entitled "AN EQUIPMENT STAND FOR A DRIVE-THRU EMPLOYEE STATION AND METHODS OF USING THE SAME", which is incorporated herein by reference.

FIELD OF THE INVENTION

The present invention relates to apparatus and methods for use at a drive thru employee station such as a drive thru terminal found at a pharmacy. More particularly, the present invention relates to an equipment stand that supports and organizes multiple media devices and/or equipment and enables easy access to, manipulation of, and/or maneuvering of the multiple media devices and/or equipment.

BACKGROUND

The use of drive-thru services allows individuals to perform transactions conveniently without leaving their vehicles. As a result of this convenience, drive-thru services at banks, ATM's and fast food restaurants are popular worldwide, and drive-thru services at pharmacies are becoming increasingly popular.

In general, drive thru services are provided at a variety of commercial establishments/facilities such as banks, pharmacies, fast food restaurants, and many other establishments as a convenience for customers. Typically, the drive-thru's consist of a customer terminal or station and a teller terminal or station. When a customer pulls his/her vehicle into a drive-thru station, the teller (e.g., pharmacist, cashier, pharmacist assistant, or any other drive thru worker) and customer proceed with a customer transaction which may include, but not be limited to, the exchange of instructions, information, questions, product, money, etc. Once the customer complete his/her transaction with the commercial establishment, the customer pulls his/her vehicle away from the terminal.

Drive thru services enable a customer to complete one or more business transactions with a commercial establishment without ever having to exit his/her vehicle. Such ease, convenience, speed, and efficiency has caused the popularity and use of drive-thru services to continually increase. Unfortunately, the increase use and demand on drive thru services has caused a decrease in through-put, i.e., a decrease in the amount of customers that may be serviced per unit of time. In other words, customer wait times have increased, which increases customer frustration and ultimately lowers customer satisfaction with the commercial establishment's customer service.

Accordingly, there is a continual need for an improved apparatus and method capable of improving the efficiency of the teller and thus the drive thru services provided to the customer.

A SUMMARY OF THE INVENTION

Accordingly, the present invention is intended to address and obviate problems and shortcomings and otherwise improve previous preform mold systems, injection mold machines, and methods regarding the same.

One exemplary embodiment of the present invention includes a drive thru terminal equipment stand comprising a base, a vertical support having a first end and a second end, wherein the first end is connected to the base, a framework connected to the second end of the vertical support; and a plurality of equipment supporting surfaces connected to the framework. The vertical support is operable to adjust the height of the framework along a vertical axis of the vertical support relative to the base. Also, the framework and the plurality of equipment supporting surfaces are operable to rotate about the longitudinal axis of the vertical support.

Another exemplary embodiment of the present invention includes a base, an adjustable vertical support having a first end and a second end, wherein the first end is connected to the base, a monocoque framework connected to the second end of the vertical support, and a plurality of equipment supporting surfaces connected to the framework. The vertical support is operable to adjust the height of the framework along a vertical axis of the vertical support relative to the base. Also, the framework and the plurality of equipment supporting surfaces are operable to rotate about the longitudinal axis of the vertical support.

Yet another exemplary embodiment of the present invention includes a drive thru terminal equipment stand comprising a base, an adjustable vertical support having a first end and a second end, wherein the first end is connected to the base, a first equipment supporting surface connected to the second end of the vertical support, a second equipment supporting surface connected to the first equipment supporting surface, and a third equipment supporting surface connected to the first equipment supporting surface. The second and third equipment supporting surfaces are spaced from the first equipment supporting surface along a vertical axis of the vertical support.

BRIEF DESCRIPTION OF THE DRAWINGS

The following detailed description of exemplary embodiments of the present invention can be best understood when read in conjunction with the following drawings, where like structure is indicated with like reference numerals and in which.

Figure 1:
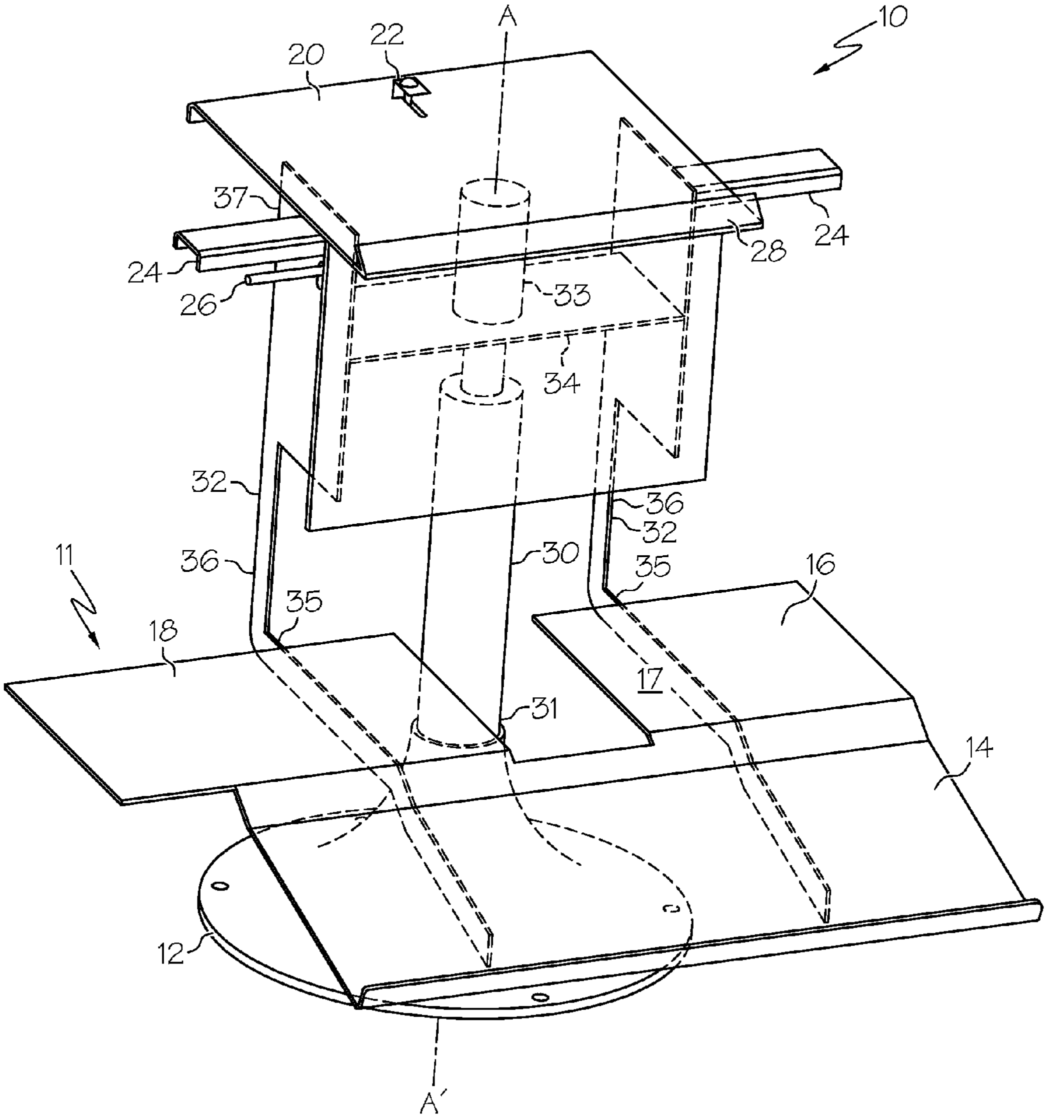
FIG. 1 is a perspective view of an exemplary embodiment of an equipment stand according to the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION ON THE INVENTION

The following text sets forth a broad description of numerous different embodiments of the present invention. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential to the present invention unless so stated. To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

In order for an employee of a commercial establishment that is working at a drive-thru terminal or station (Teller Terminal) such as a pharmacist or bank teller's drive thru terminal to transact business with a customer located at one of the customer terminals or stations (Customer Terminal), the Teller Terminal may include a variety of media devices and/or equipment located at or near the Teller Terminal and/or a window located at the Teller Terminal (e.g., drive thru window). Exemplary devices and/or equipment that may be positioned at the station may include, but not be limited to, items such as a telephone, computer keyboard, computer mouse, monitor, printer, document scanner, barcode scanner, and/or any other equipment known to one of ordinary skill in the art. It is desired that all of such devices and equipment be easily and conveniently accessible to the teller.

Referring to FIG. 1, an exemplary embodiment of a media and equipment stand 10 for a Teller Terminal of a drive thru at a retail store, particularly a pharmacy drive thru, that may be used by an employee such as a pharmacist, cashier, assistant, or any other employee is shown. Stand 10 may include a base 12, an adjustable vertical support 30, framework 32, a monitor tray 20, a prescription tray 28, height adjustment handles 24, a height adjustment lever 26, and/or a single, integral unit 11 comprising a keyboard tray 14, a mouse tray 16, a phone supporting surface 18, and a printer supporting surface 17. In the exemplary embodiment, vertical support 30 is an adjustable gas cylinder having a first support end 31 and a second support end 33. First end 31 is attached to base 12, and second end 33 is attached to monitor tray 20 and/or framework 32.

Framework 32, in the exemplary embodiment shown, includes a first horizontal frame 34, a second horizontal frame 35, and a vertical frame 36 connecting the two horizontal frames together. Second horizontal frame 35 is attached to the phone supporting surface 18, printer supporting surface 17, mouse tray 16, and/or keyboard tray 14. Vertical frame 36 is attached to first horizontal frame 34, and first horizontal frame 34 is, in turn, connected to second support end 33.

Figure 2:
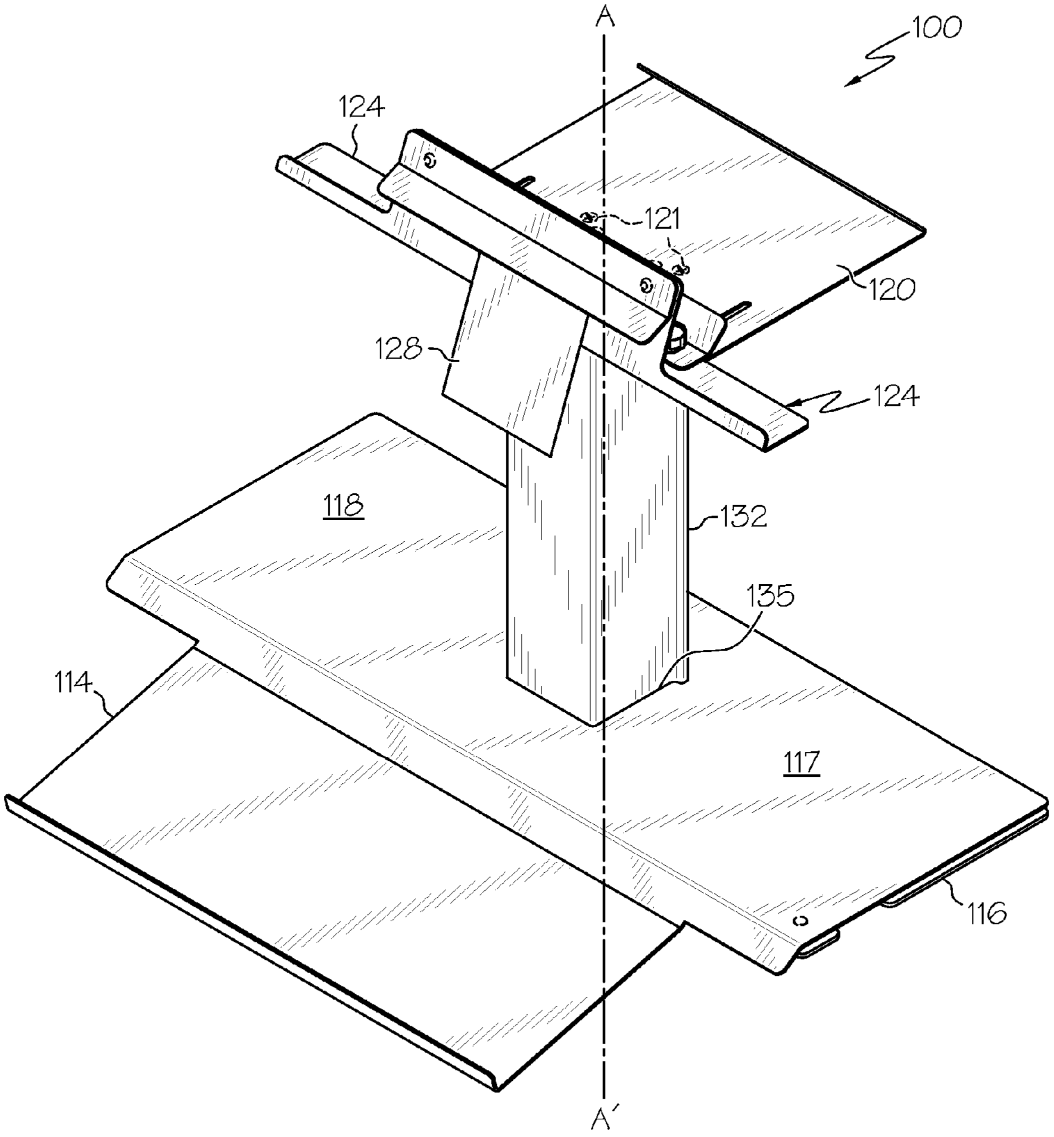
FIG. 2 is a perspective view of another exemplary embodiment of an equipment stand according to the present invention.
Figure 3:
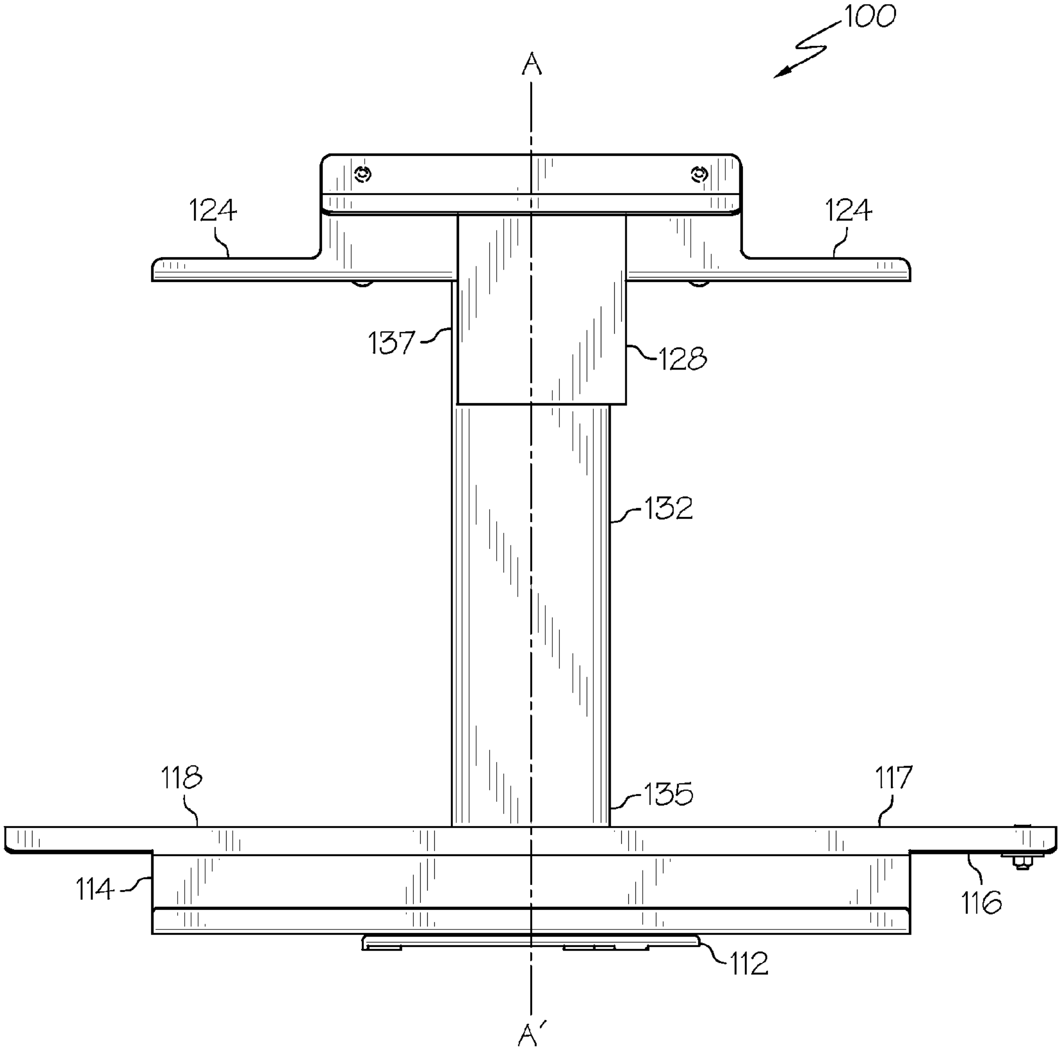
FIG. 3 is a front elevational view of the stand illustrated in FIG. 2.
Figure 4:
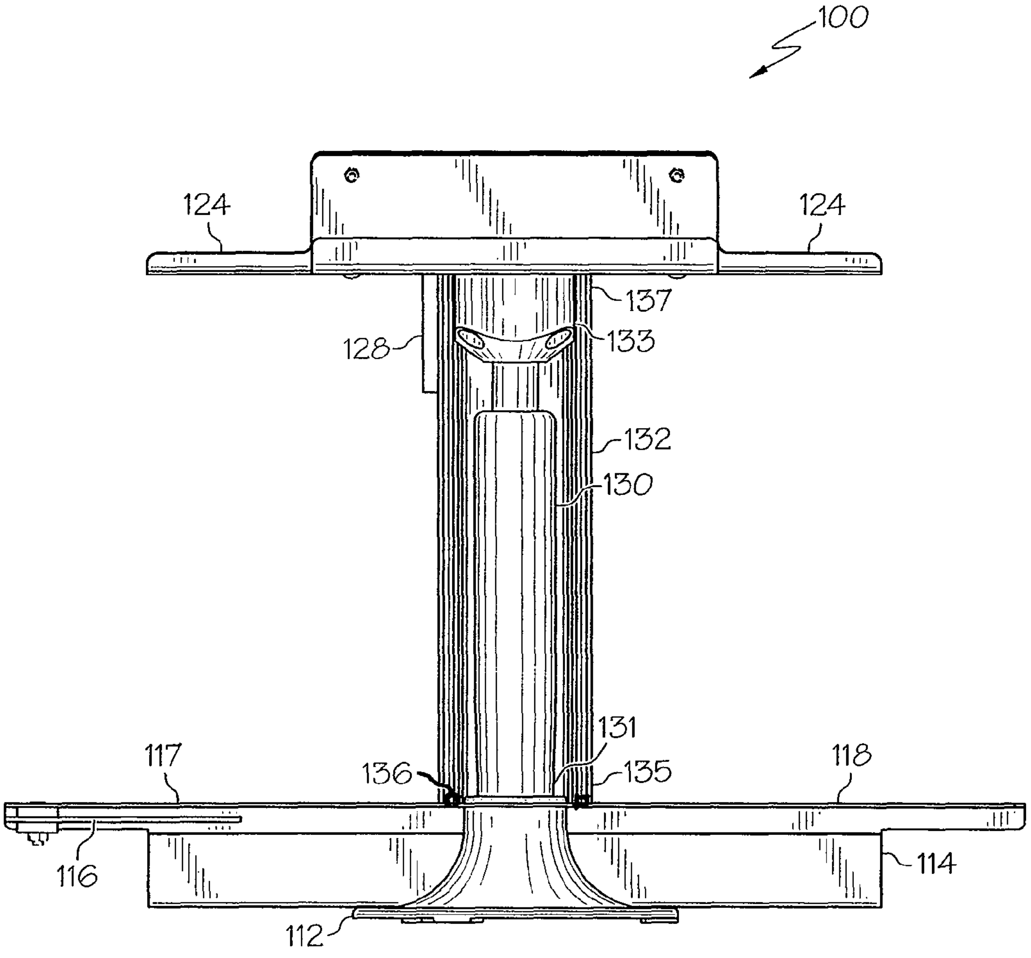
FIG. 4 is rear elevational view of the stand illustrated in FIG. 2.
Figure 5:
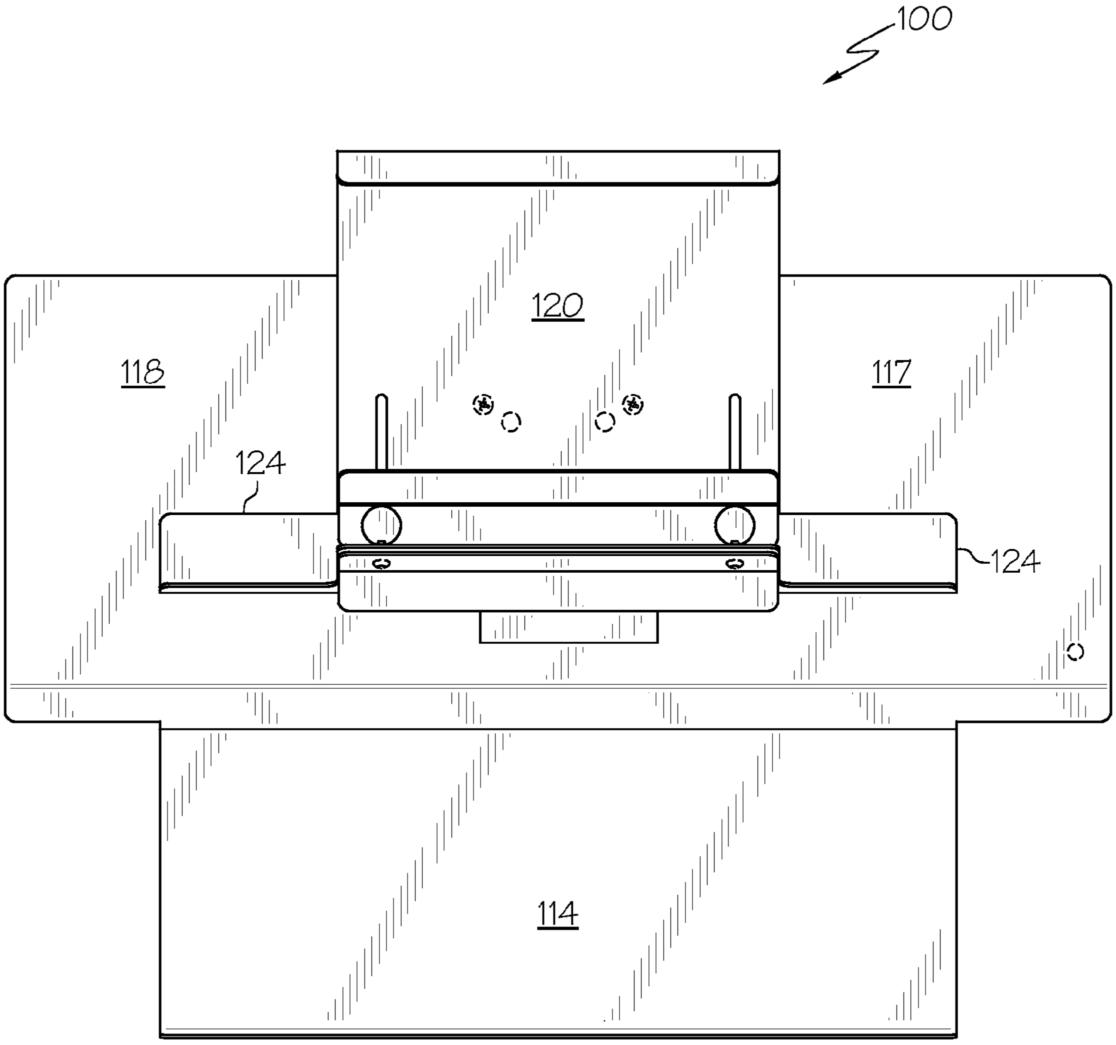
FIG. 5 is a top plan view of the stand illustrated in FIG. 2.
Figure 6:
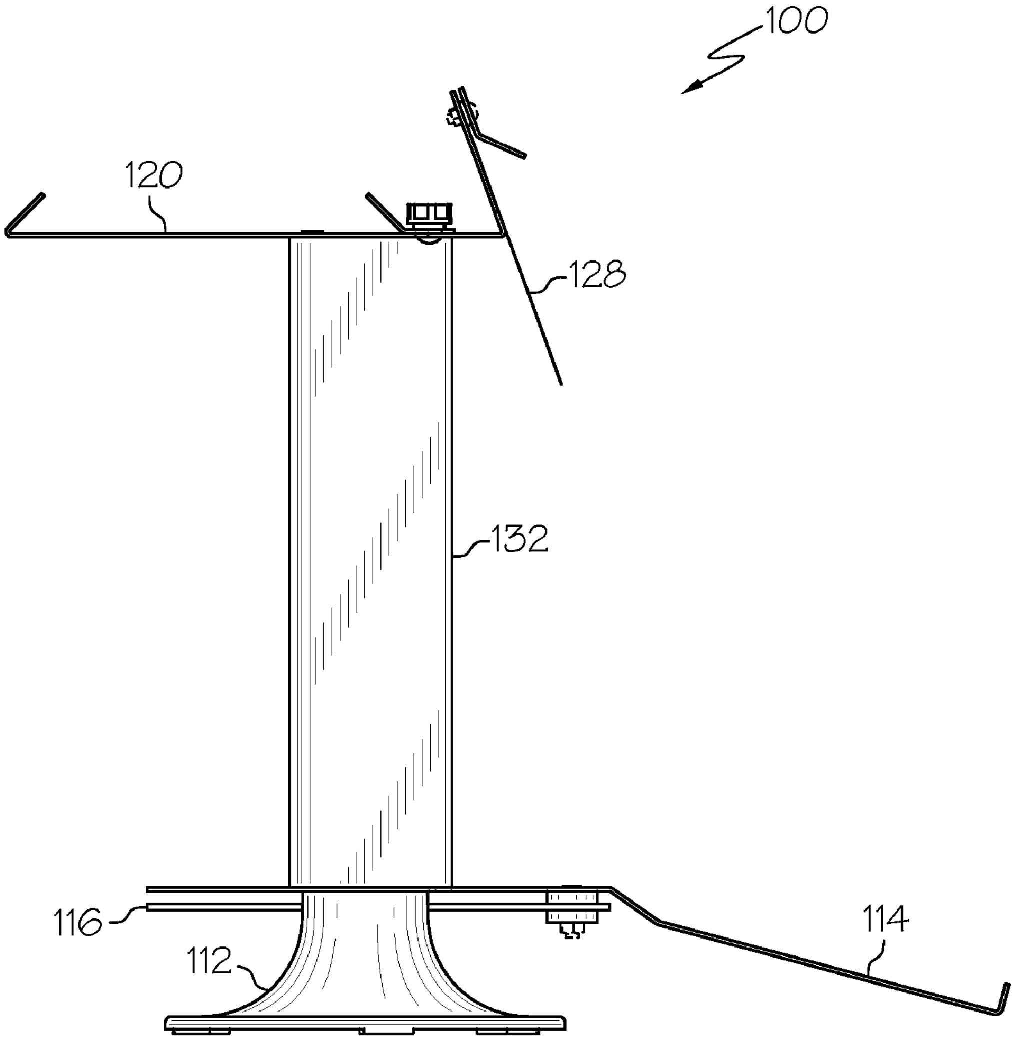
FIG. 6 is a side elevational view of the stand illustrated in FIG. 2.

Keyboard tray 14, mouse tray 16, printer supporting surface 17, and phone supporting surface 18 are optionally one single, integral unit. However, it is understood that the keyboard tray, mouse tray, printer supporting surface, and phone supporting surface can be divided into one or more components (e.g., multiple components) each separately connected to the framework and/or each other, instead of the integral unit as shown. For example, mouse tray 16 may be a separate component that is rotatably mounted to printer supporting surface 17 (see FIG. 2). Keyboard tray 14 is disposed at an angle from a horizontal plane to position keyboard 2 at a more ergonomically correct position as known to one of ordinary skill in the art. It is understood that in one exemplary embodiment keyboard tray 14 is adjustable to a variety of angles from the horizontal plane and/or a vertical plane as known to one of ordinary skill in the art. Additionally, it is understood that keyboard tray 14 may be rotatably connected to framework 32 such that it may swing or rotate about a vertical axis (e.g., axis A-A', FIG. 1) relative to the framework.

As set forth above, monitor tray 20 is attached to an end 37 of vertical frame 36. In the exemplary embodiment, tray 20 is positioned at an angle from a horizontal plane and may be adjustable relative to the horizontal plane and/or a vertical plane to ease the viewing of a monitor placed or mounted on monitor tray 20. Prescription tray 28 may be integral to or attached to the monitor tray 20. Prescription tray 28, in one exemplary embodiment, may be adjustable as to its angle from a horizontal plane and/or a vertical plane as well. Prescription tray 28 is configured to permit a pharmacist or other user to place prescription sheets or other paperwork on the tray to review and/or write on.

The two height adjustment handles 24 extend from opposite sides of framework 32 (e.g., vertical frame 36) such that a user may hold them to adjust the height of stand 10. Located just below one of the handles 24 is an adjustment lever 26 that is capable of locking and unlocking the stand into a variety of heights and/or positions. Lever 26 is configured to unlock the stand such that vertical support 30 may be expanded or contracted to adjust the height of the stand, for example, adjust the height of monitor tray 20. Once at the desired height, lever 26 may be released to lock or fix the stand at the desired height. It is understood that a variety of other methods and devices may be used to lock and/or unlock the stand in various positions, heights, and/or orientations.

Additionally, stand 10 may be configured to rotate about vertical axis A-A'. In the exemplary embodiment shown in FIG. 1, second end 33 (e.g., inner cylinder of the gas cylinder) is configured to rotate within the outer cylinder (e.g., outer cylinder of gas cylinder of vertical support 30) relative to first end 31. Since framework 32 is only attached to second end 33 of vertical support 30, framework 32 and everything attached to it (e.g., keyboard tray 14, mouse tray 16, printer supporting surface 17, phone supporting surface 18, monitor tray 20, prescription tray 28, etc.) are capable of rotating about vertical axis A-A'. It is understood that either locking lever 26 or another device may be configured to permit a user to lock the stand (e.g., second end 33 and all the components attached to it such as keyboard tray 14, mouse tray 16, monitor stand 20, etc.) in a desired position about axis A-A'. This rotational and adjustable height motion of all the components and/or equipment mounted on or supported by the stand provides the user the ability to position and/or orient equipment in a more ergonomically-correct position while working with customers at the drive thru window. The present invention provides a more flexible, adaptable, and convenient stand for drive thru terminal equipment and/or media devices.

Referring to FIGS. 2-6, another exemplary embodiment of the media and equipment stand of the present invention is shown as 100. Stand 100 may include a base 112, an adjustable vertical support 130, framework 132, a keyboard tray 114, a mouse tray 116, a phone supporting surface 118, a printer supporting surface 117, a monitor tray 120, a prescription tray 128, and/or height adjustment handles 124. In the exemplary embodiment, vertical support 130 is an adjustable gas cylinder having a first support end 131 and a second support end 133. First support end 131 is attached to base 112 and second support end 133 is attached to monitor tray 120. Such connections may be made using any device and/or method as known to one of ordinary skill in the art. In the exemplary embodiment, first support end 131 is welded to base 112, and second support end 133 is connected to monitor tray 120 using screws 121. Other exemplary connection devices that may be used to connect first and second support ends 131 and 133 to base 112 and monitor tray 120 are welds, nut-bolt connections, screws (e.g., machine screws), adhesives, snap-fit connections, and any other connection device as known to one of ordinary skill in the art. Optionally, second support end 133 may be attached to framework 132 as well.

Framework 132 comprises a monocoque construction, which provides a rigid but light weight structure. Framework 132 may include a first framework end 135 and a second framework end 137. At first framework end 135, framework 132 is attached to the phone supporting surface 118, printer supporting surface 117, and/or keyboard tray 114 using screws 136 (e.g., machine screws). Second framework end 137 is attached to monitor tray 120 using screws (not shown). Other exemplary connection devices that may be used to connect first and second framework ends 135 and 137 to the phone supporting surface 118, printer supporting surface 117, and/or keyboard tray 114 and the monitor tray 120, respectively, are welds, nut-bolt connections, screws (e.g., machine screws), adhesives, snap-fit connections, and any other connection device as known to one of ordinary skill in the art. Keyboard tray 114, phone supporting surface 118, and printer supporting surface 117 are fabricated, in this exemplary embodiment, into a single, integral unit. In addition, keyboard tray 114, phone supporting surface 118, printer supporting surface 117, and mouse tray 116 are connected to first framework end 135 such that the unit may be easily and efficiently removed and/or replaced with a new unit. Such a design enables the stand 100 to be easily modified to incorporate new support surfaces, trays, and/or structures for different types of equipment as the needs and requirements for equipment change with the ever-changing needs of the business due to changing operating procedures and/or client needs. For example, such a design enables the keyboard tray, phone supporting surface, printer supporting surface, and mouse tray to be removed and replaced with a unit that includes a support surface for a document scanner (not shown) to scan prescriptions.

At the opposite end 137, framework 132 is attached to monitor tray 120, prescription tray 128, and optionally, second support end 133. Monitor tray 120 and prescription tray 128 may be fabricated, in this exemplary embodiment, into a single, integral unit. In addition, monitor tray 120 and prescription tray 128 are connected to second framework end 137 and second support end 133 such that the monitor tray/prescription tray unit may be easily and efficiently removed and/or replaced with a new unit. Such a design enables the stand 100 to be easily modified to incorporate new support surfaces, trays, and/or structures for different types of equipment as the needs and requirements for equipment change with the ever-changing needs of the business due to changing operating procedures and/or client needs. For example, such a design enables the monitor tray 120 and prescription tray 128 to be removed and replaced with a unit that includes a support surface for a different piece of equipment such as a product bar code scanner (not shown), magnetic strip reader, etc., to scan products bar codes, prescription labels, medical and/or healthcare smart cards/credit cards, etc.

In the exemplary embodiment, keyboard tray 114, printer supporting surface 117, and phone supporting surface 118 are one single, integral unit. In addition, mouse tray 116 is rotatably mounted to keyboard tray 114. Mouse tray 116 may rotate out from under or back under keyboard tray 114 in a stored and un-stored position, respectfully. However, it is understood that the keyboard tray, mouse tray, printer supporting surface, and phone supporting surface can be divided into one or more units (e.g., multiple components) or one single, integral units. Keyboard tray 114 is disposed at an angle from a horizontal plane to position the keyboard at a more ergonomically correct position as known to one of ordinary skill in the art. It is also understood that keyboard 114 may adjustable to a variety of angles from the horizontal plane and/or a vertical plane as known to one of ordinary skill in the art in one exemplary embodiment.

As set forth above, monitor tray 120 is attached to second support end 133 of vertical support 130 and second framework end 137 of framework 132. In the exemplary embodiment, tray 120 is positioned at an angle from the horizontal plane to ease the viewing of a monitor placed or mounted on monitor tray 120. Prescription tray 128 may be integral to or attached to the monitor tray 120. Prescription tray 128 is configured to permit a pharmacist or other user to place prescription sheets or other paperwork on the tray to review and/or write on. Prescription tray 128 may be configured to be disposed at an angle from a horizontal plane to simplify viewing and writing on the prescription sheet. Both the monitor and prescription tray angles may be adjustable relative to both a horizontal plane and a vertical plane as known to one of ordinary skill in the art.

The two height adjustment handles 124 extend from opposite sides of framework 132 such that a user may hold them to adjust the height of stand 100. Stand 100 may also include a position mechanism that permits the stand's height to be adjusted and then locks the stand into that specific height position. Such a mechanism would be known to one of ordinary skill in the art. In the exemplary embodiment shown, the gas cylinder permits the stand's height to be adjusted (i.e., lowered or raised), and due to gas pressure within the cylinder, it holds the stand at that adjusted height.

Keyboard tray 114, mouse tray 116, printer supporting surface 117, phone supporting surface 118, monitor tray 120, and prescription tray 128 may rotate about a vertical axis A-A' of stand 100. This rotational motion of all the components and/or equipment mounted on or supported by the stand provides the user of stand 100 flexibility and convenience while working with a customer at the drive thru window.

Figure 7:
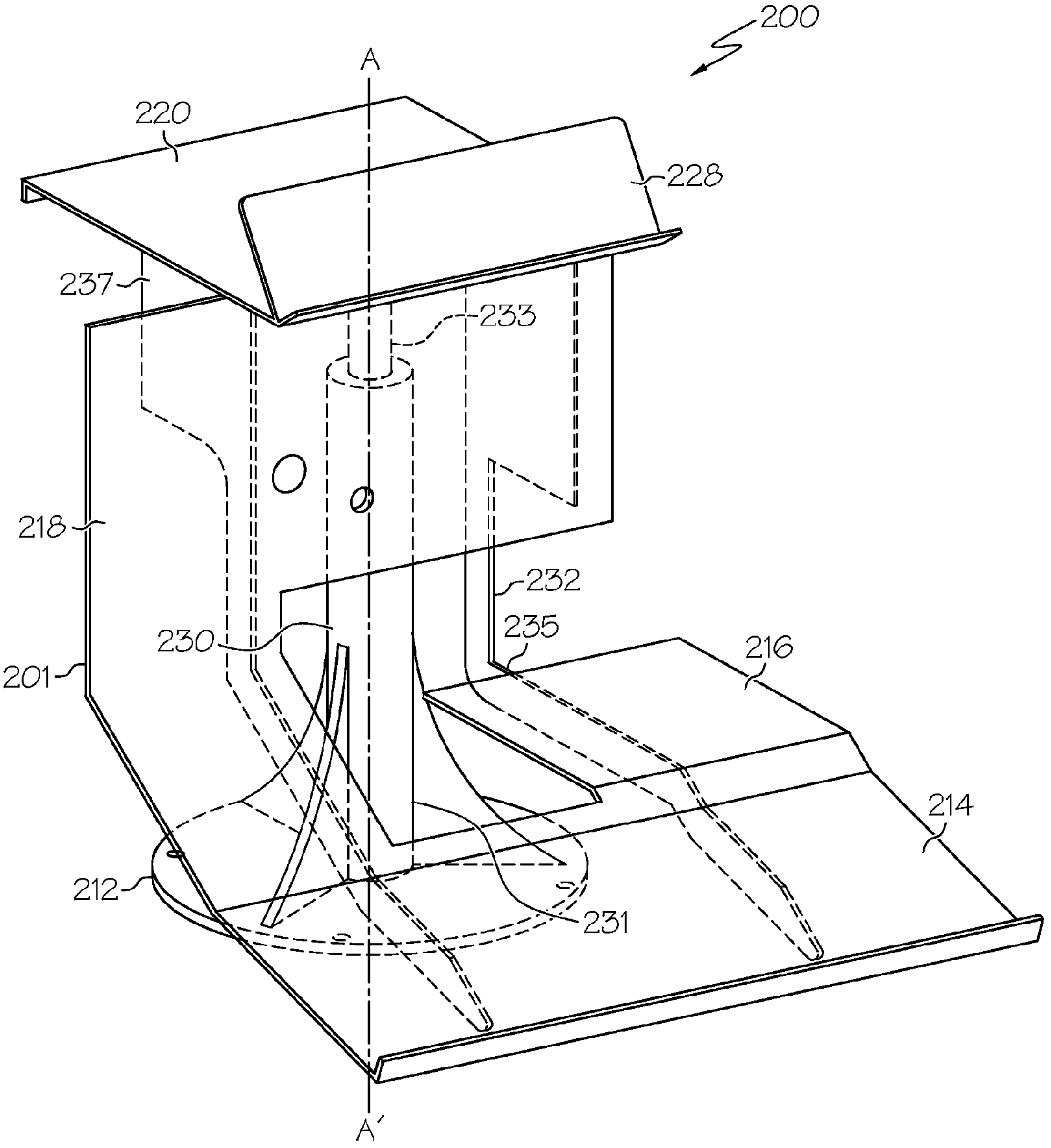
FIG. 7 is a perspective view of an exemplary embodiment of an equipment stand according to the present invention.
Figure 8:
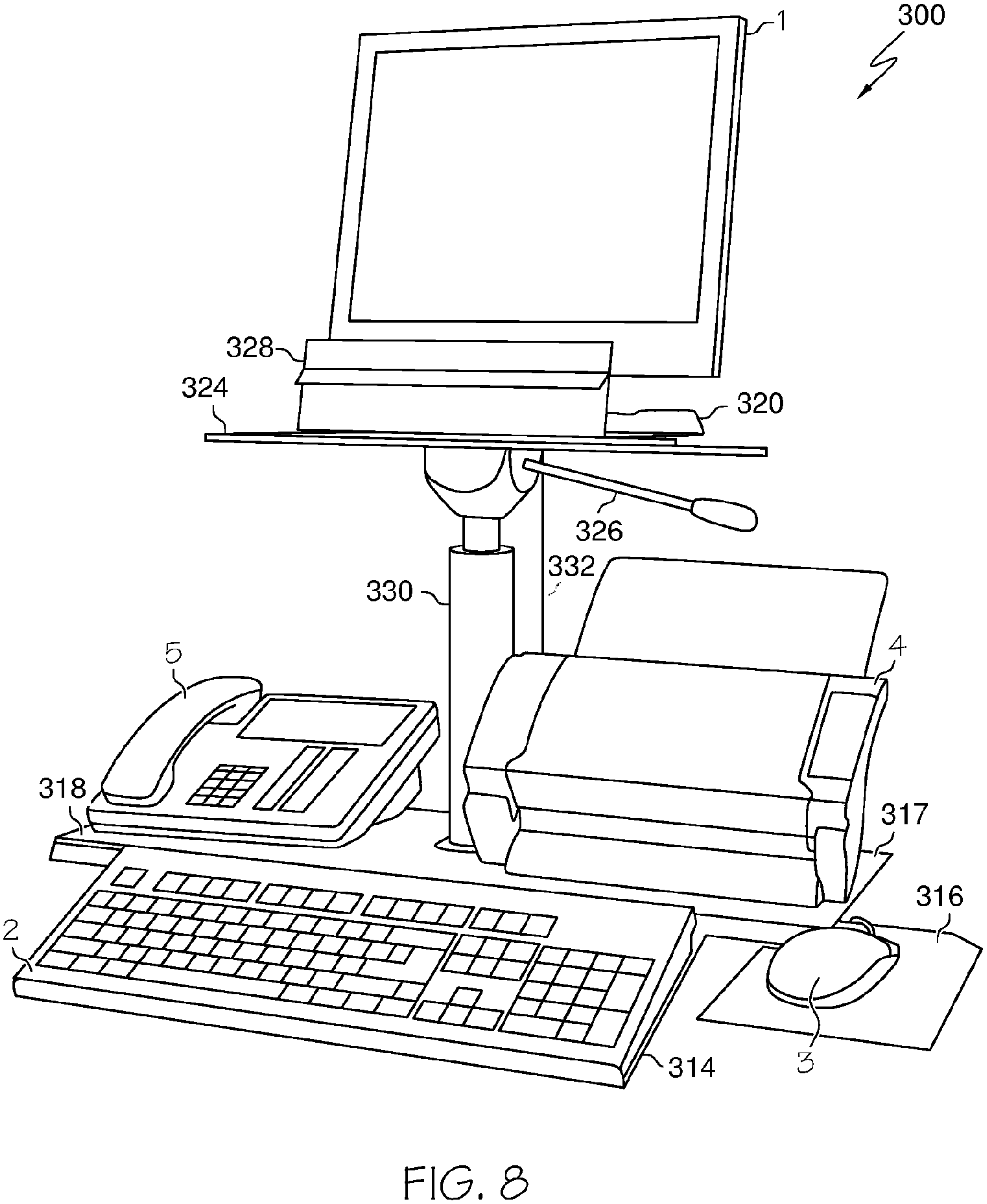
FIG. 8 is a perspective view of an exemplary embodiment of an equipment stand according to the present invention with equipment supported upon the stand.

Referring to FIG. 7, another exemplary embodiment of the media and equipment stand of the present invention is shown as 200. Stand 200 may include a base 212, an adjustable vertical support 230, framework 232, a monitor tray 220, a prescription tray 228, and a single, integral unit 201 comprising a keyboard tray 214, a mouse tray 216, a phone supporting surface 218, and a printer supporting surface 217. In the exemplary embodiment, vertical support 230 is an adjustable gas cylinder having a first support end 231 and a second support end 233. First support end 231 is attached to base 212 and second support end 233 is attached to monitor tray 220 and/or framework 232. Framework 232 may include a first framework end 235 and a second framework end 237. At first framework end 235, framework 232 is attached to integral unit 201. At the opposite end 237, framework 232 is attached to monitor tray 220 and/or second support end 233.

Keyboard tray 214 and mouse tray 216 are disposed at an angles from a horizontal plane in order to position the keyboard and mouse at more ergonomically correct positions as known to one of ordinary skill in the art. It is also understood that keyboard tray 214 and mouse tray 216 may be adjustable to a variety of angles from the horizontal plane and/or a vertical plane as known to one of ordinary skill in the art in one exemplary embodiment. In addition, framework 232 and integral unit 201 are attached to second support end 233 such that may rotate about a vertical axis A-A' of stand 200 relative to first support end 231 and base 212, thus permitting monitor tray 220, prescription tray 228, keyboard tray 214, mouse tray 216, phone supporting surface 218, and printer supporting surface 217 to rotate about axis A-A'.

As set forth above, monitor tray 220 is attached to second support end 233 of vertical support 230 and second framework end 237 is attached to monitor tray 220. In the exemplary embodiment, tray 220 is positioned at an angle from a horizontal plane to ease the viewing of a monitor placed or mounted on monitor tray 220. This angle may also be adjustable relative to the horizontal plane. In addition, monitor tray 220 may be adjustable relative to a vertical plane as well. Prescription tray 228 may be integral to or attached to the monitor tray 220. Prescription tray 228 is configured to permit a pharmacist or other user to place prescription sheets or other paperwork on the tray to review and/or write on. Prescription tray 228 may be configured to be disposed at an angle from a horizontal plane to simplify viewing and writing on the prescription sheet. The prescription tray angle may be adjustable relative to the horizontal plane and/or a vertical plane as known to one of ordinary skill in the art. Both the monitor and prescription trays may be fabricated as two separate units connected together or one, single integral unit. In addition, the monitor and prescription trays may be configured to be easily removed from and connected to stand 200 to provide easy and convenient replacement of such trays as well as the option of providing additional supporting surfaces and/or trays to the stand. Such flexibility permits the stand to meet the ever-changing needs and requirements of the business and the customer.

Stand 200 may also include a position mechanism that permits the stand's height to be adjusted and then locks the stand into that specific height position. Such a mechanism would be known to one of ordinary skill in the art. In the exemplary embodiment shown, the gas cylinder permits the stand's height to be adjusted (i.e., lowered or raised), and due to gas pressure within the cylinder, it holds the stand at that adjusted height.

Referring to FIGS. 8-12, yet another exemplary embodiment of the present invention is shown as an equipment stand 300. Equipment stand 300 includes Stand 300 is shown as supporting a keyboard 2 on a keyboard tray 314, a mouse 3 on a mouse tray 316, a printer 4 positioned on a printer supporting surface 317, a phone 5 on a phone supporting surface 318, and a monitor 1 on a monitor tray 320. In addition, mouse tray 316 is rotatably mounted to and underneath phone supporting surface 317 such that mouse tray 316 may be rotated out from under or back under phone supporting surface 317 in a stored (shown in FIGS. 9-12) and un-stored position (shown in FIG. 8), respectfully. In this exemplary embodiment, the stand may or may not include an adjustment lever 326, which is capable of operating the same as or similar to the first exemplary embodiment's adjustment lever 26 set forth above and shown in FIG. 1. Stand 300 is shown with adjustment lever 326 in FIG. 8 and without adjustment lever 326 in FIGS. 9-12, but with two handles 324.

Figure 9:
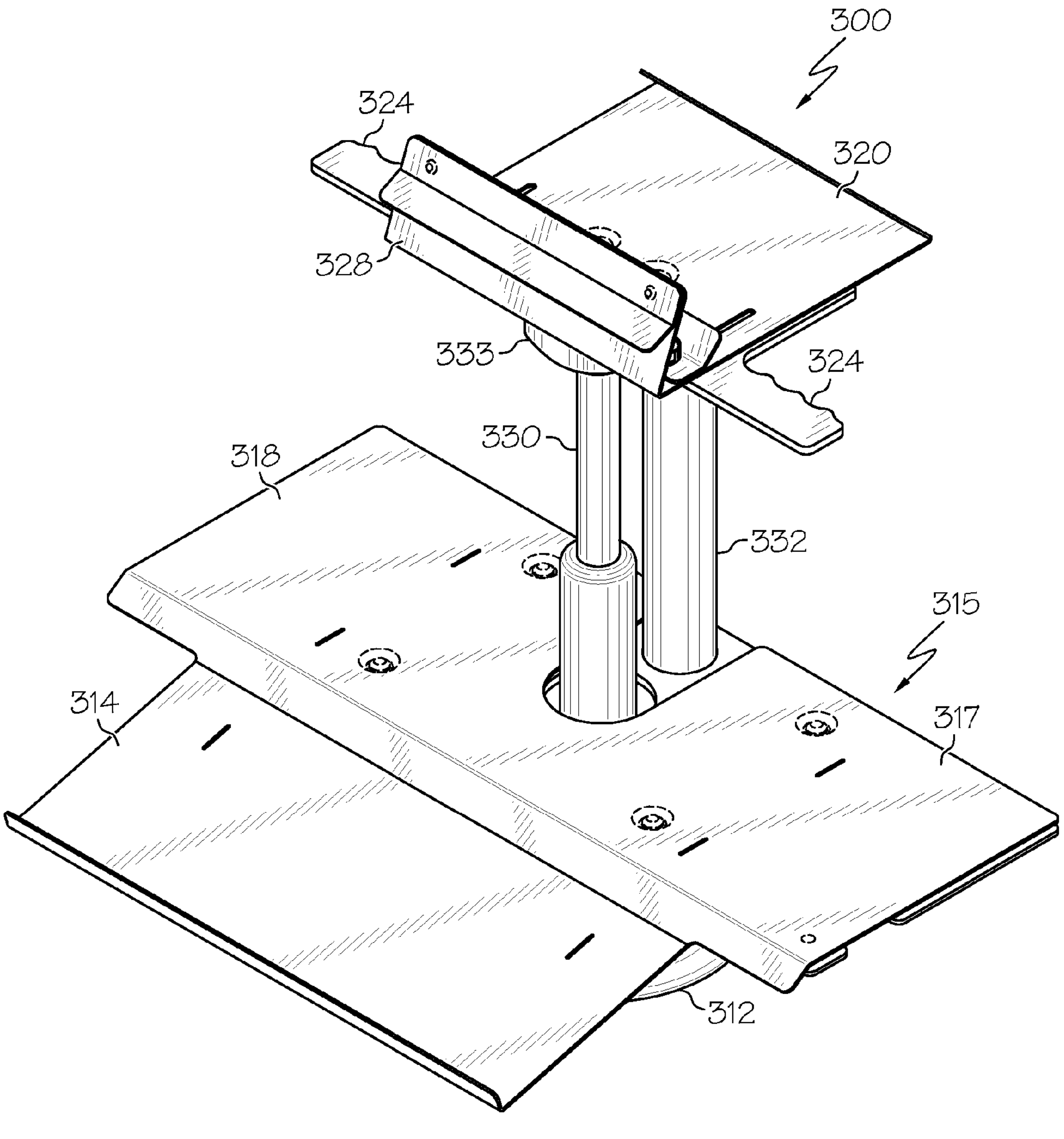
FIG. 9 is a perspective view of an exemplary embodiment of an equipment stand according to the present invention.
Figure 10:
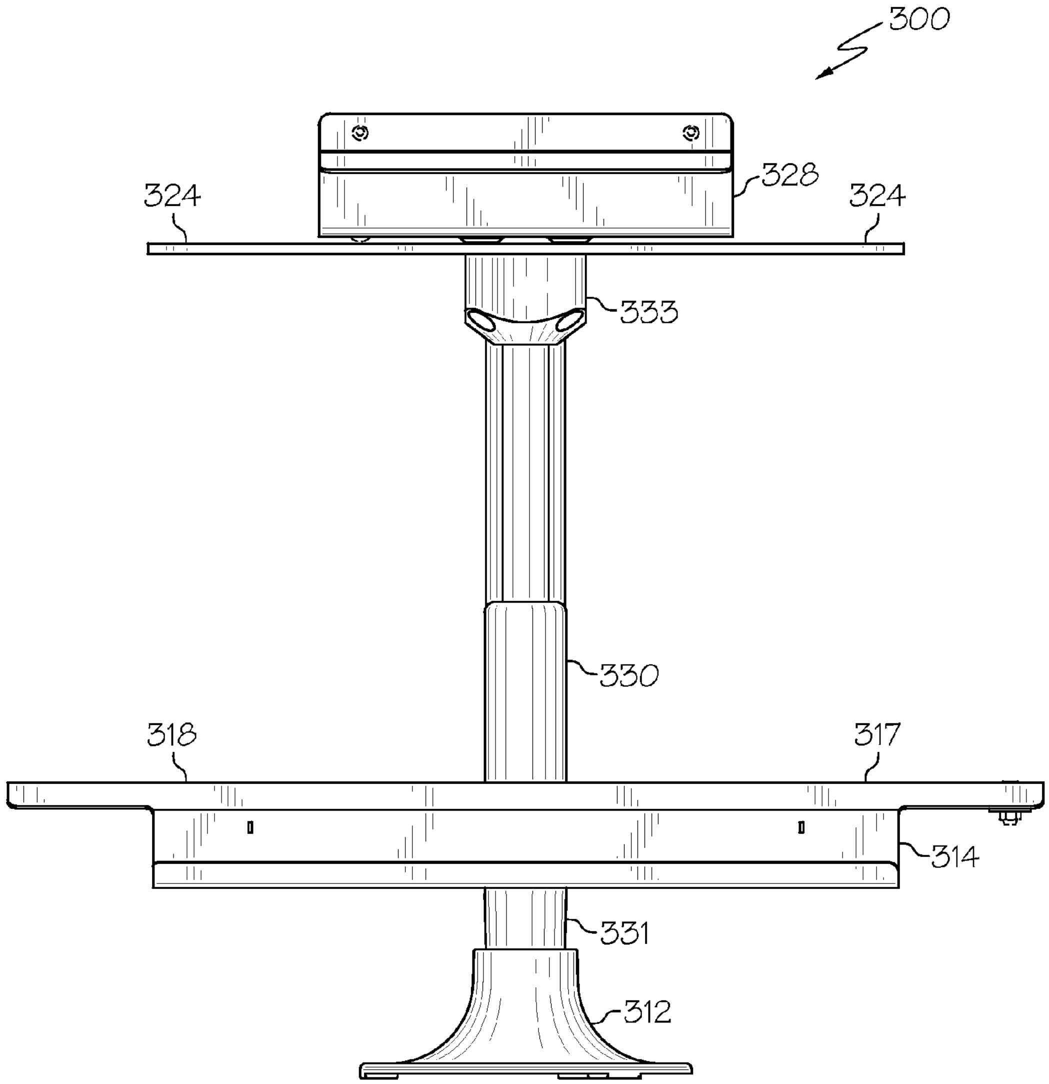
FIG. 10 is a front elevational view of the stand illustrated in FIG. 9.
Figure 11:
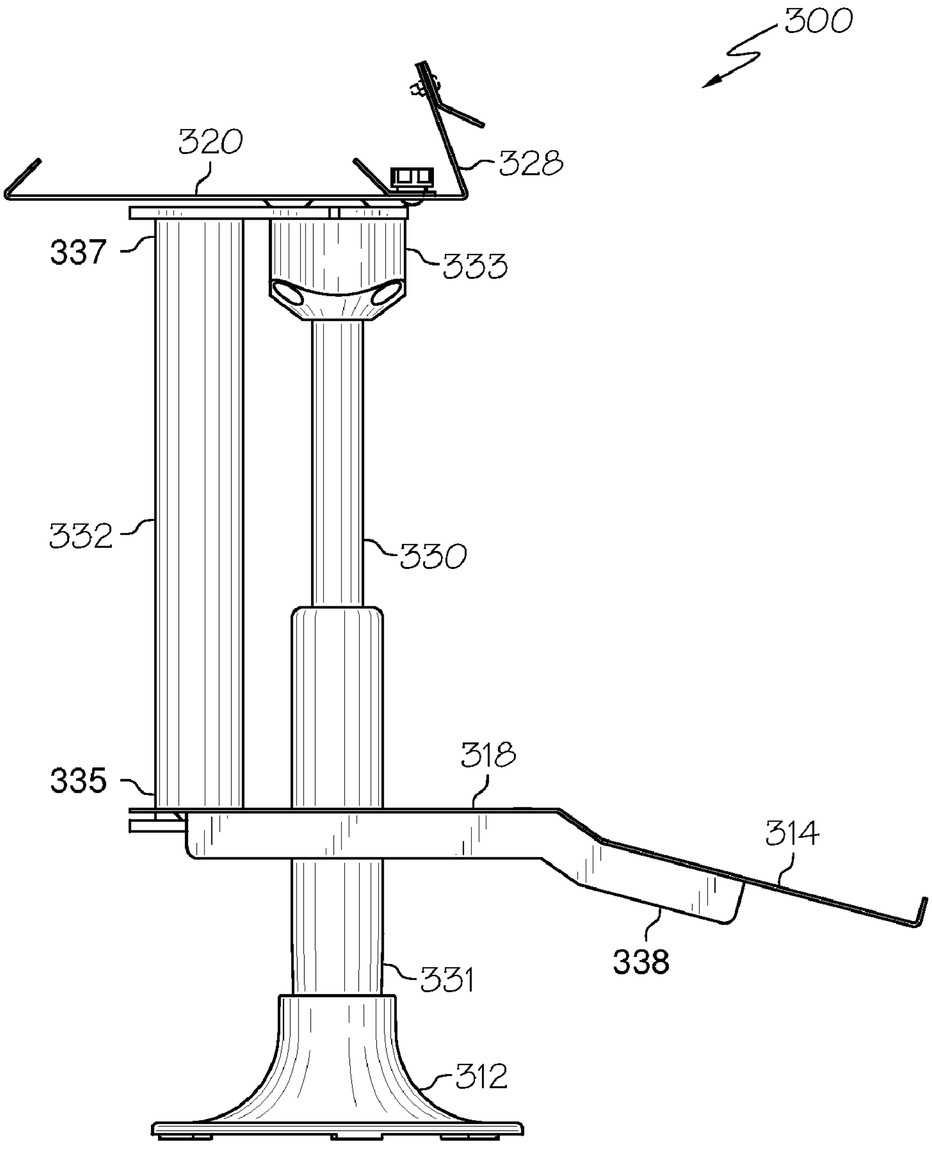
FIG. 11 is a side elevational view of the stand illustrated in FIG. 9.
Figure 12:
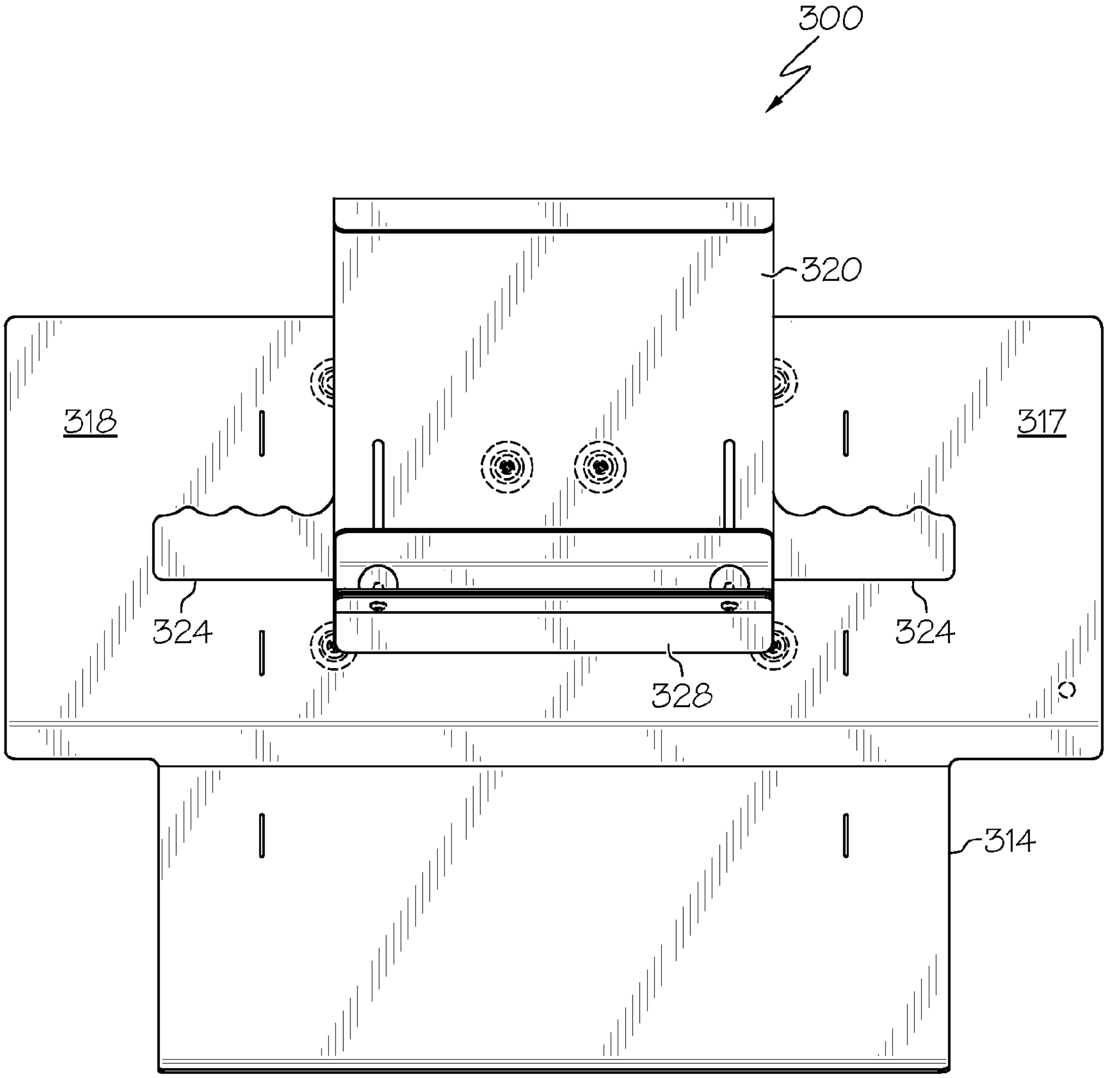
FIG. 12 is a top plan view of the stand illustrated in FIG. 9.

Stand 300 includes a vertical support 330 that includes a first end 331 and a second end 333. Stand 300 also includes a vertical framework 332 connected at a first vertical framework end 335 to a horizontal framework 338 and connected at a second vertical framework end 337 to monitor tray 320. Horizontal framework 338 is connected to one or more of the following: printer supporting surface 317, phone supporting surface 318, keyboard tray 314, and/or mouse tray 316. Printer supporting surface 317, phone supporting surface 318, and keyboard tray 314, in the exemplary embodiment, are all one single, integral unit 315 As shown in FIG. 9, integral unit 315 includes an aperture 313 disposed therein in order for vertical support 330 to pass through unimpeded. This permits integral unit 315 to be driven up and down via second support end 333 of vertical support 330 without being impeded from a lower end of vertical support 330 (e.g., first support end 331).

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A drive thru terminal equipment stand comprising:
- a base;
- a vertical support having a first end and a second end, wherein the first end is connected to the base;
- a framework connected to the second end of the vertical support; and
- a plurality of equipment supporting surfaces connected to the framework, the plurality of equipment supporting surfaces comprising:
  - a front equipment supporting surface; and
  - side equipment supporting surfaces located at opposite sides of the vertical support and extending outwardly from the front equipment supporting surface;

wherein the vertical support is operable to adjust a height of the framework along a vertical axis of the vertical support relative to the base;

wherein the framework and the plurality of equipment supporting surfaces are operable to rotate about the vertical axis of the vertical support;

wherein the second end of the vertical support is connected to the framework at a location above the plurality of equipment supporting surfaces operable to rotate about the vertical support; and wherein, with the framework in a front facing orientation with the front equipment supporting surface facing a user, the front equipment supporting surface being located at a front of the vertical support and the side equipment supporting surfaces extending rearwardly from the front equipment supporting surface beyond the vertical support.

2. The equipment stand of claim 1, wherein the vertical support is a gas cylinder, the gas cylinder having an outer cylinder and an inner cylinder positioned within the outer cylinder.

3. The equipment stand of claim 2, wherein the inner cylinder rotates within and relative to the outer cylinder, and wherein the inner cylinder comprises the second end and the outer cylinder comprises the first end.

4. The equipment stand of claim 1, wherein the framework comprises an upper tray located above the plurality of equipment supporting surfaces, the second end of the vertical support being connected to the upper tray.

5. The equipment stand of claim 4, wherein at least one of the side equipment supporting surfaces extends outwardly beyond the upper tray in a widthwise direction.

6. The equipment stand of claim 4 further comprising a prescription tray connected to the upper tray and extending downwardly toward the front equipment supporting surface to provide a vertically oriented support surface located at least partially below the upper tray.

7. The equipment stand of claim 4, wherein the upper tray comprises a monitor supporting surface.

8. The equipment stand of claim 4, wherein at least a portion of the front equipment supporting surface is at a lower elevation than the side equipment supporting surfaces.

9. The equipment stand of claim 4, further comprising a handle connected to the framework that extends outwardly beyond the upper tray in a widthwise direction such that the handle is grasped by a user at a location adjacent the upper tray for adjusting the height of the framework relative to the base.

10. The equipment stand of claim 9, further comprising a height adjustment lever that is operable to lock and unlock the framework into and from a position.

11. The equipment stand of claim 1, wherein the plurality of equipment supporting surfaces comprises at least one side equipment surface extending outwardly beyond the front equipment surface in a widthwise direction.

12. A drive thru terminal equipment stand comprising:

a base;

an adjustable vertical support having a first end and a second end, wherein the first end is connected to the base;

a monocoque framework connected to the second end of the vertical support; and a plurality of equipment supporting surfaces connected to the framework;

wherein the vertical support is operable to adjust the height of the framework along a vertical axis of the vertical support relative to the base;

wherein the framework and the plurality of equipment supporting surfaces are operable to rotate about the vertical axis of the vertical support;

wherein the second end of the vertical support is connected to the framework at a location above the plurality of equipment supporting surfaces connected to the framework, the plurality of equipment supporting surfaces rotatable about the vertical support are located below the second end of the vertical support and the plurality of equipment supporting surfaces extend about the vertical support such that the plurality of equipment supporting surfaces surround the vertical support.

13. The equipment stand of claim 12, wherein the plurality of equipment supporting surfaces comprises:

a front equipment supporting surface connected to the framework; and side equipment supporting surfaces located at opposite sides of the vertical support and extending outwardly from the front equipment supporting surface.

14. The equipment stand of claim 13, wherein the front and side equipment supporting surfaces are operable to support an employee equipment selected from the group consisting of a keyboard, mouse, scanner, printer, and telephone.

15. The equipment stand of claim 12 further comprising a prescription tray connected to the framework adjacent the second end of the vertical support that extends downwardly to provide a vertically oriented support surface.

16. The equipment stand of claim 12, wherein the monocoque framework at least partially surrounds the vertical support such that at least one of the plurality of equipment supporting surfaces connected to the framework rotates about the vertical support when the framework rotates.

17. The equipment stand of claim 12, wherein the plurality of equipment supporting surfaces are operable to support a plurality of employee equipment selected from the group consisting of a monitor, a keyboard, a computer mouse, a printer, a scanner, and a telephone.

18. The equipment stand of claim 12, wherein the plurality of equipment supporting surfaces are all one integral unit.

19. The equipment stand of claim 14, wherein the plurality of equipment supporting surfaces comprise a computer mouse supporting surface rotatably connected to a keyboard supporting surface.

* * * * *